(12) United States Patent
Lorenz et al.

(10) Patent No.: US 8,872,831 B2
(45) Date of Patent: Oct. 28, 2014

(54) SEMANTIC-DRIVEN PROFILE CURVE INTERPOLATION FOR SWEPT-SURFACE EXTRUSION

(75) Inventors: Haik H. Lorenz, Berlin (DE);
Konstantin Baumann, Potsdam (DE)

(73) Assignee: Autodesk, Inc., San Rafael, CA (US)

( * ) Notice: Subject to any disclaimer, the term of this patent is extended or adjusted under 35 U.S.C. 154(b) by 409 days.

(21) Appl. No.: 13/190,301

(22) Filed: Jul. 25, 2011

(65) Prior Publication Data
US 2013/0027385 A1    Jan. 31, 2013

(51) Int. Cl.
*G06T 11/20* (2006.01)
*G06T 17/10* (2006.01)
*G06K 9/00* (2006.01)
*G06T 17/05* (2011.01)

(52) U.S. Cl.
CPC *G06T 17/10* (2013.01); *G06T 17/05* (2013.01)
USPC .......................................... 345/442; 382/154

(58) Field of Classification Search
USPC .......................................... 345/442; 382/154
See application file for complete search history.

(56) References Cited

U.S. PATENT DOCUMENTS

2006/0177121 A1* 8/2006 Chaperon ..................... 382/154
2009/0033658 A1* 2/2009 Rockwood et al. ........... 345/420

OTHER PUBLICATIONS

"Levenshtein distance", http://en.wikipedia.org/wiki/Levenshtein_distance, last modified Jul. 1, 2011.
"Needleman-Wunsch algorithm", http://en.wikipedia.org/wiki/Needleman-wunsch_algorithm, last modified Jun. 2, 2011.
"Smith-Waterman algorithm", http://en.wikipedia.org/wiki/Smith-Waterman_algorithm, last modified May 6, 2011.
"Ramer-Douglas_Peucker algorithm", http://en.wikipedia.org/wiki/Ramer-Douglas-Peucker_algorithm, last modified May 20, 2011.

* cited by examiner

*Primary Examiner* — Kimbinh T Nguyen
*Assistant Examiner* — Raffi Isanians
(74) *Attorney, Agent, or Firm* — Gates & Cooper LLP (57) ABSTRACT

A method, apparatus, system, and computer readable storage medium provide the ability to transition between two different profile curves in a swept surface extrusion. Each curve has section sequences that include consecutive sections, which in turn include constant attributes, which in turn include graphic attributes and semantic attributes. The section sequences define a semantic pattern for each profile curve. A globally optimal match is computed between the sections of the different curves. Adapted curves are generated that are structurally identical but geometrically resemble their respective original curves. An actual profile curve is computed for a given position on an extrusion line using a one-to-one vertex position morphing based on the adapted curves. The swept surface extrusion is performed and the result is displayed.

24 Claims, 9 Drawing Sheets

|   |   | G | S | G | C | B | R | C | G | C | R | B | C | G | S | G |
|---|---|---|---|---|---|---|---|---|---|---|---|---|---|---|---|---|
|   | 0 | 0 | 0 | 0 | 0 | 0 | 0 | 0 | 0 | 0 | 0 | 0 | 0 | 0 | 0 | 0 |
| S | -1 | 0 | 7000 | 6999 | 6994 | 6988 | 6981 | 6973 | 6964 | 6954 | 6943 | 6931 | 6918 | 6904 | 6889 | 6873 |
| B | -3 | 0 | 7000 | 6999 | 6996 | 14994 | 14993 | 14987 | 14980 | 14972 | 14963 | 14953 | 14942 | 14930 | 14917 | 14903 |
| C | -6 | 0 | 7000 | 6999 | 12999 | 14994 | 14993 | 14990 | 14986 | 14981 | 14975 | 14968 | 14960 | 14951 | 14941 | 14930 |
| R | -10 | 0 | 7000 | 6999 | 12999 | 14994 | 24994 | 24993 | 24989 | 24984 | 24978 | 24971 | 24963 | 24954 | 24944 | 24933 |
| R | -15 | 0 | 7000 | 6999 | 12999 | 14994 | 24994 | 24993 | 24990 | 24986 | 34984 | 34983 | 34976 | 34968 | 34959 | 34949 |
| C | -21 | 0 | 7000 | 6999 | 12999 | 14994 | 24994 | 24993 | 24990 | 24986 | 34984 | 34983 | 40983 | 40982 | 40977 | 40971 |
| B | -28 | 0 | 7000 | 6999 | 12999 | 14994 | 24994 | 24993 | 24990 | 24986 | 34984 | 42984 | 42984 | 42981 | 42978 | 42974 |
| S | -36 | 0 | 7000 | 6999 | 12999 | 14994 | 24994 | 24993 | 24990 | 24986 | 34984 | 42984 | 42983 | 42981 | 49981 | 49980 |

FIG. 10

| | | G | S | G | C | B | R | C | G | C | R | B | C | G | S | G |
|---|---|---|---|---|---|---|---|---|---|---|---|---|---|---|---|---|
|   | 0   | 0 | 0    | 0    | 0     | 0     | 0     | 0     | 0     | 0     | 0     | 0     | 0     | 0     | 0     | 0     |
| S | -1  | 0 | 7000 | 0    | 6994  | 6988  | 6981  | 6973  | 6964  | 6954  | 6943  | 6931  | 6918  | 6904  | 6889  | 6873  |
| B | -3  | 0 | 7000 | 6999 | 6996  | 14994 | 14993 | 14987 | 14980 | 14972 | 14963 | 14953 | 14942 | 14930 | 14917 | 14903 |
| C | -6  | 0 | 7000 | 6999 | 12999 | 14994 | 14993 | 14990 | 14986 | 14981 | 14975 | 14968 | 14960 | 14951 | 14941 | 14930 |
| R | -10 | 0 | 7000 | 6999 | 12999 | 14994 | 24994 | 24993 | 24989 | 24986 | 24978 | 24971 | 24963 | 24954 | 24944 | 24933 |
| R | -15 | 0 | 7000 | 6999 | 12999 | 14994 | 24994 | 24993 | 24990 | 24986 | 34984 | 34983 | 34976 | 34968 | 34959 | 34949 |
| C | -21 | 0 | 7000 | 6999 | 12999 | 14994 | 24994 | 24993 | 24990 | 24986 | 34984 | 34983 | 40983 | 40982 | 40977 | 40971 |
| B | -28 | 0 | 7000 | 6999 | 12999 | 14994 | 24994 | 24993 | 24990 | 24986 | 34984 | 42984 | 42983 | 42981 | 42978 | 42974 |
| S | -36 | 0 | 7000 | 6999 | 12999 | 14994 | 24994 | 24993 | 24990 | 24986 | 34984 | 42984 | 42983 | 42981 | 42981 | 42980 |

FIG. 11

SEMANTIC-DRIVEN PROFILE CURVE INTERPOLATION FOR SWEPT-SURFACE EXTRUSION

BACKGROUND OF THE INVENTION

1. Field of the Invention

The present invention relates generally to creating three-dimensional (3D) geometry from two-dimensional (2D) line data, and in particular, to a method, apparatus, and article of manufacture for transitioning between two different profile curves during a swept surface extrusion operation used to create 3D geometry.

2. Description of the Related Art

Swept surface extrusion is a well-known operation for generating 3D objects from line data. It uses a, usually 2D, profile curve that is conceptually moved along lines to form 3D geometry. The profile curve is oriented orthogonally relative to the respective line. In many situations, the profile curve may vary during the extrusion. For example, the curve may transition from one profile curve (having a first number of points) to another profile curve (having a second number of points) during the sweep operation. Prior art methods fail to automatically and efficiently transition between two profile curves that have different numbers of points. Instead, prior art methods transition using linear interpolation and/or require a manual configuration and interpolation configuration. Such problems may be better understood with a description of prior art 3D creation and profile extrusion transitions.

There is abundant prior art in the field of swept surface extrusion. This includes surfaces of revolution as well as extrusions along (not necessarily straight) lines. In the context of the present invention, the focus is on extrusions along lines with the goal of computing triangles (for a 3D mesh) and the attributes of the resulting surface.

Figure 1:
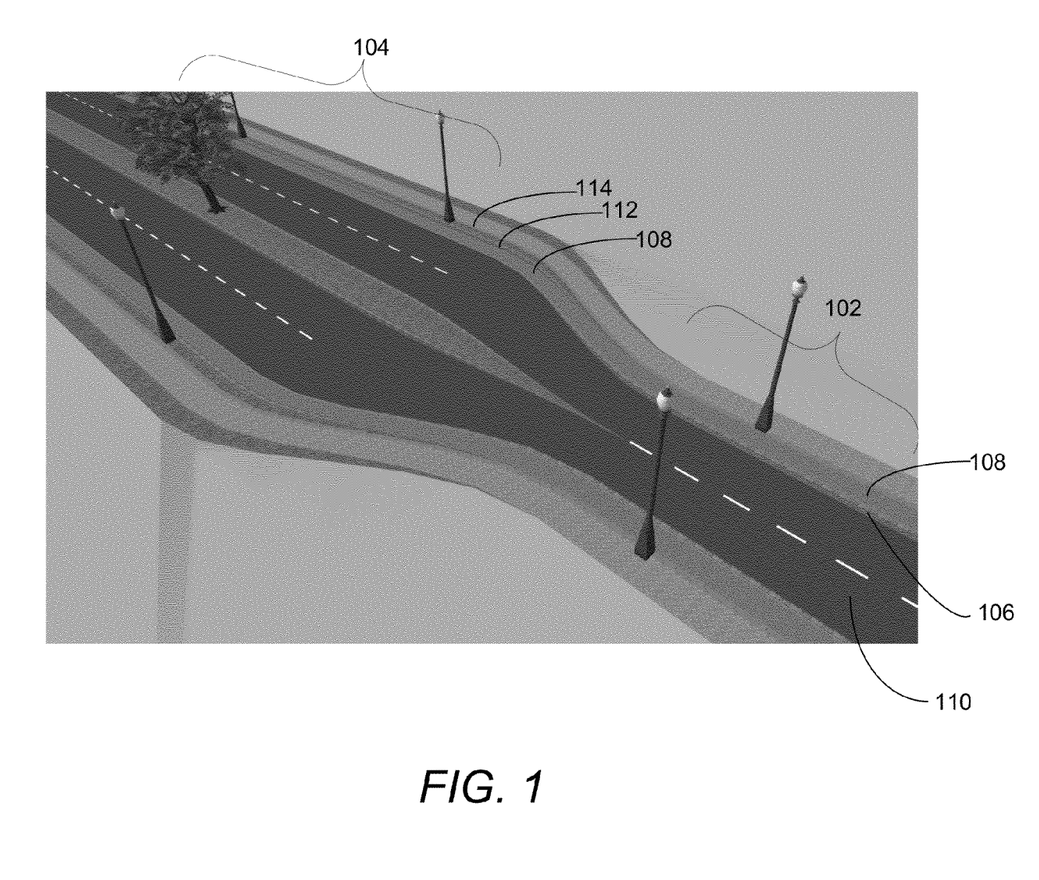
FIG. 1 illustrates an example transition between two road styles in accordance with one or more embodiments of the invention.

An exemplary use case in the context of the present invention is that of the generation of road geometry from a road network. The geometry is derived using an attributed profile curve with attributes, such as normal, texture, and purpose. The attributes are assigned to sections of the profile curve and can be used, e.g., for controlling the visual appearance of the resulting road. When the style changes within a road or at road connections, a suitable transition needs to be generated. For example, driving lanes in both styles need to be seamlessly connected in order to enable travelling cars. FIG. 1 illustrates an example transition between two road styles. Each road style 102 and 104 is represented by an attributed profile curve. Methods must be able to identify and connect matching profile curve sections (such as roadway, bikeway, and sidewalk). In the example of FIG. 1, the curb 106 between bikeway 108 and roadway 110 (in the undivided road 102) fades out while a new curb 112 between bikeway 108 and green-space 114 fades in (in the divided road 104).

The prior art fails to provide the ability to create a smooth transition from the undivided road 102 to the divided road 104 in an automated fashion. Such a transition is also known in the prior art as morphing. Morphing is a common technique for transitioning between two different profile curves in swept surface extrusion. Morphing interpolates vertex coordinates of one profile curve along the transition such that it becomes identical to the other profile curve. For road styles, this approach cannot guarantee a suitable transition that enables a seamless transition.

In the context of 3D geometry, morphing transforms geometric representations. Typically, morphing denotes the smooth transformation of one 3D object's geometry into another 3D object's geometry. A frequent usage is the blending of key frame geometry for animation. There exists a large number of morphing techniques, optimized for various use cases and focusing on certain properties of the objects. For example, morphing can preserve volume, minimize curvature or texture distortion, consider appearance information, or prevent self-intersections. Also, changes in topology can be handled differently. With respect to geo-data in street networks, the focus is on one-to-one vertex position morphing. Such an approach requires both objects to contain the same number of vertices in the same topology. Then, the morphed object can be formed by using the common topology and interpolating the positions of corresponding vertices in both objects. Correspondence can be simply defined by an identical vertex number. The interpolation can employ any desired function, typically linear or smoothstep interpolation.

Some prior art techniques may apply a profile curve morphing within a transition zone. However, the prior art employs a simple priority-based profile curve matching and thus fails to find an optimal section matching. Alternative prior art techniques provide corridors as a means for generating roads. Such corridors are generated from an alignment (2D centerline), a profile (elevation of the centerline), and an assembly (profile curve). An assembly consists of subassemblies representing different road sections such as roadway, curb, or sidewalk. While the prior art may provide large freedom for assemblies along an alignment, there is no matching of similar sections/categories (e.g., roadway, curb, sidewalk, etc.). Instead, the prior art relies on the user to fine tune transitions using respective subassemblies. In yet another prior art system, objects extrude arbitrary cross sections along a path using generic morphing between cross sections. However, cross sections need to have identical vertex count for morphing—a matching of some sort is not applied. Similar extrusion objects or swept surface objects may be available in various 3D content creation tools.

While morphing contains some building blocks for enabling a smooth transition (e.g., adjusting matching sections, or inserting collapsed sections), using a string edit distance for matching may improve results. String edit distances can be used to compare two strings, typically genome or protein sequences, through the use of string manipulations (e.g., character insertion, deletion, or substitution). Two strings are considered more similar the fewer manipulations it takes to convert one into the other. A well-known string edit distance is the Levenshtein distance, which weights all manipulations equally. Other string edit distances differ in the allowed manipulations and weighting schemes.

Consequently, as described above, the prior art fails to provide an efficient and simple mechanism for morphing/transitioning between two profile curves on a road/street network. Thus, what is needed is the ability to enable sound, automatic, and smooth transitions between arbitrary attributed profile curves. Such a capability that is well suited for processing large road networks with only small user interaction is also desirable.

SUMMARY OF THE INVENTION

Embodiments of the invention enable the automatic creation of a transition between differing profile curves based on semantic attributes through the use of an optimization technique and improves on other profile curve morphing techniques.

In particular, embodiments of the invention can be used for road geometry generation from line data. In such a scenario, there is a catalogue of road styles, each being an attributed profile curve. For each line, a style is selected and 3D geometry is generated using swept-surface extrusion. Connections between changing styles need to result in smooth and sound transitions, which may require seamlessly connected surfaces for the various road users (e.g., cars, bikes, or pedestrians). Moreover, there is an importance related to such connections, e.g., a seamless surface for cars is more important than for pedestrians. Such an importance is used to resolve conflicts.

Examples for road style changes are:
1) a road changing into a bridge,
2) a road changing into a tunnel,
3) a road changing the number of driving lanes, or
4) a divided road changing into a regular road at a city entrance.

Embodiments of the invention can also be used to handle style transitions between adjacent roads at intersections.

To provide for such transitions, embodiments of the invention first compute a globally optimal match between profile curve sections based on their attributes. Then, missing sections are inserted into either profile curve. The insertion collapses a section to a single point such that the newly created profile curves match the original profile curves in terms of geometry. Finally, morphing is applied within each section. As the result, matching sections seamlessly transition into each other while mismatching sections emerge from or collapse into a single point.

BRIEF DESCRIPTION OF THE DRAWINGS

Referring now to the drawings in which like reference numbers represent corresponding parts throughout:

FIG. 11 illustrates the backtracking for the example in FIG. 6 in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention concentrate on the connection between differing profile curves during swept-surface extrusion. As used herein, roads are used as an example use case for description purposes. Other non-road based implementations are intended to be within the scope of the invention. Roads are represented by a center line and a profile curve. The 3D representation is created by sweeping the profile curve along the center line, thus creating 3D geometry. Embodiments assume that attributed profile curves and such curves are separated into sections of identical attributes, such as surface normal, color, texture, type, or purpose. These attributes can be used to guide visualization (e.g., texture) or traffic simulations (e.g., type). In embodiments of the invention, the attributes are used to determine matching sections that need to be seamlessly connected.

The connection between two roads of differing styles or a style change within a road is mapped to a one-dimensional interpolation problem. Thus, the connection requires some transition zone, in which the start profile curve (P1) transitions smoothly into the end profile curve (P2). This transition zone is defined in terms of length along the centerline with a parameter t running from 0.0 at the start to 1.0 at the end of the transition zone. T is used for interpolating between the start and end profile curves (P1 and P2) within the transition zone, such that the sweep operation uses a location-dependent profile curve.

Embodiments of the invention generate a parameterized profile curve, that is then applied during the swept-surface extrusion within the transition zone. The parameterization uses a simple one-to-one vertex morphing approach between two suitably adapted profile curves P1' and P2'. The original profile curves P1 and P2 are, in general, not suited for such a morphing as they differ in their sections and vertex count.

Based on the above, the profile curves P1 and P2 are prepared for the morphing. The goal is identifying matching sections in P1 and P2, and then inserting non-matching sections of P2 into P1 and vice versa. In other words, the missing sections from P2 are inserted into P1 and vice versa. Consequently, in the end, the adapted profile curves P1' and P2' consist of the same arrangement of sections and the same number of vertices (while retaining identical appearance with P1 and P2). Such a creation of adapted profile curves P1' and P2' requires finding the optimal match between sections from P1 and P2 according to the aforementioned attributes. Semantic information about the sections' purpose (such as roadway, bikeway, sidewalk, etc.) is of particular interest, where each attribute value has an associated importance. The optimal match is determined using an adapted string edit distance function (e.g., Needleman & Wunsch function—see en.wikipedia.org/wiki/Needleman-Wunsch_algorithm or the Smith-Waterman function—see en.wikipedia.org/wiki/Smith-Waterman_algorithm, both of which are incorporated by reference herein). In such an adapted function, a distance is employed that allows only insertions and deletions and weights matches according to their attributes while it penalizes consecutive sequences of insertions (or deletions) with the square of their length. The computation of such distances requires exhaustive search of all possible manipulations. It can be efficiently implemented using dynamic programming. However, embodiments may not use the actual edit distance, but derive the corresponding sequence of manipulations needed to transform one input string into the other. Conceptually, from the sequence of manipulations, a new string is built that contains both input strings in a (suitably defined) optimal way.

Using the optimal match, P1 and P2 are split into sequences of matching and mismatching sections. Accordingly, the result of this matching is an ordered list of matching section pairs along with subsequent, ordered mismatches from P1 and P2. For creating P1', all mismatching sections from P2 are collapsed into a single point and inserted into P1 at the appropriate locations. P2' is generated similarly. In other words, to create P1', the result list is iterated. For each entry, first the matching section from P1 is copied to P1' and adjusted to have the same number of vertices as the matching section from P2. Second, the mismatches are added one by one. Either the next mismatch from P1 or from P2 is chosen based on their importance. A mismatch from P1 is simply copied to P1'. A mismatch from P2 is first collapsed into the current endpoint of P1' and then added to P1'. This collapsing only manipulates the vertex positions of the profile curve section and no other attributes. The resulting P1' is a profile curve that contains all sections from P1 plus mismatched sections from P2, which are collapsed into a single point. Thus, P1' and P1 have identical appearance. P2' is constructed from the result list accordingly. In the end, P1' and P2' contain the same arrangement of sections and the same number of vertices, prepared for morphing.

Hardware Environment

Figure 2:
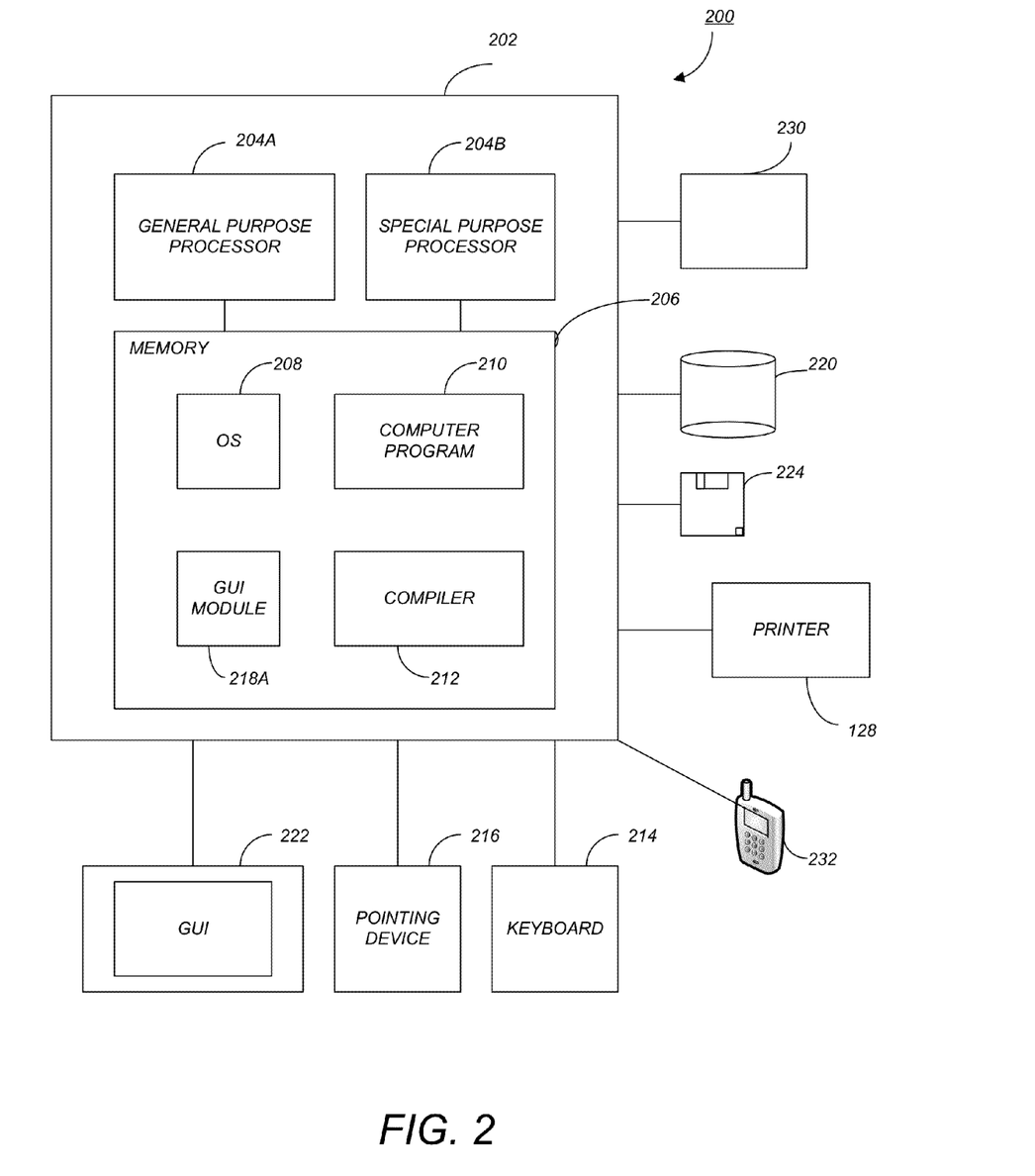
FIG. 2 is an exemplary hardware and software environment used to implement one or more embodiments of the invention.

FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to or integrated with other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, iPod™, Nook™, portable digital video player, cellular device, personal digital assistant, etc.).

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors. In one or more embodiments, the display 222 is integrated with/into the computer 202 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, Pascal, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers 202.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Figure 3:
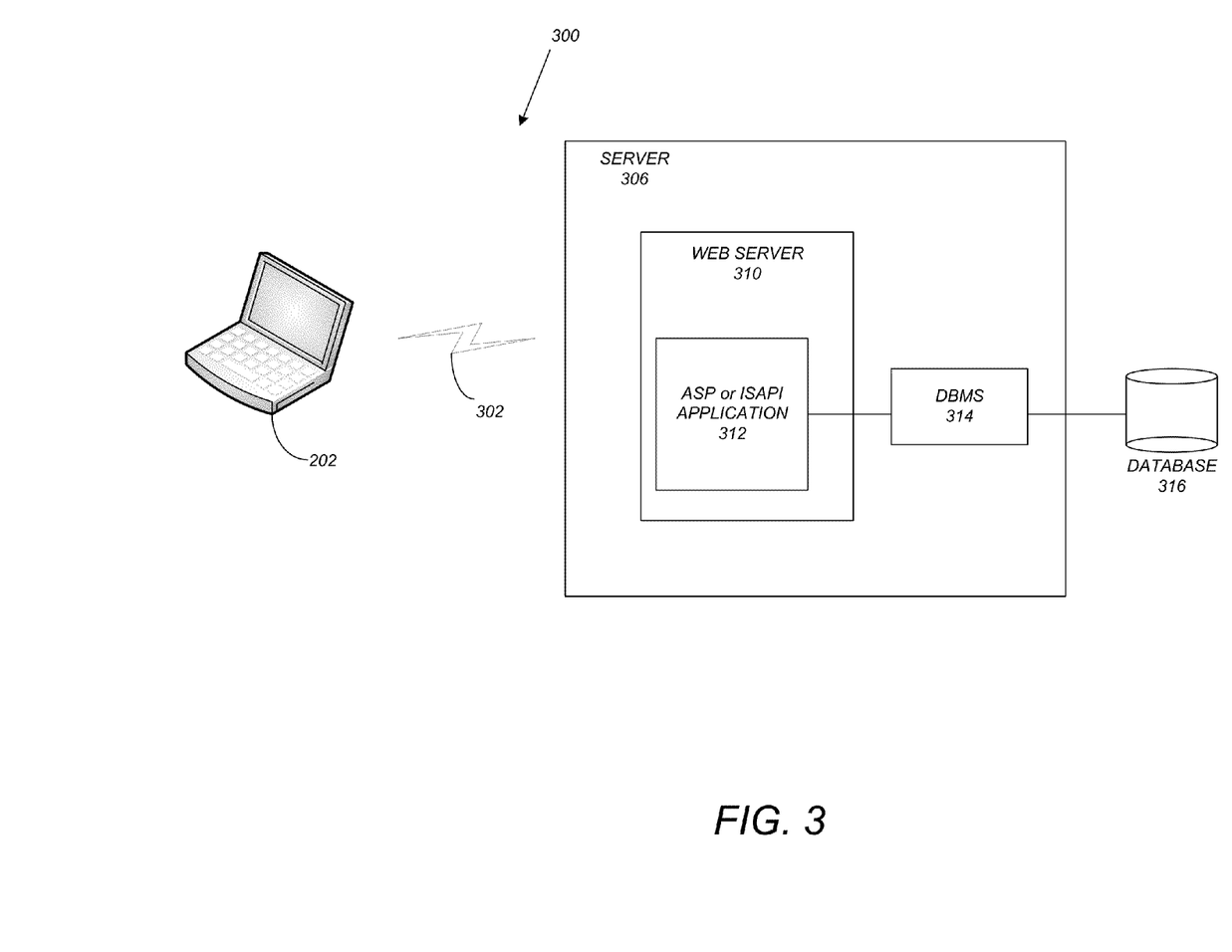
FIG. 3 schematically illustrates a typical distributed computer system using a network to connect client computers to server computers in accordance with one or more embodiments of the invention.

FIG. 3 schematically illustrates a typical distributed computer system 300 using a network 302 to connect client computers 202 to server computers 306. A typical combination of resources may include a network 302 comprising the Internet, LANs (local area networks), WANs (wide area networks), SNA (systems network architecture) networks, or the like, clients 202 that are personal computers or workstations, and servers 306 that are personal computers, workstations, minicomputers, or mainframes (as set forth in FIG. 2).

A network 302 such as the Internet connects clients 202 to server computers 306. Network 302 may utilize ethernet, coaxial cable, wireless communications, radio frequency (RF), etc. to connect and provide the communication between clients 202 and servers 306. Clients 202 may execute a client application or web browser and communicate with server computers 306 executing web servers 310. Such a web browser is typically a program such as MICROSOFT INTERNET EXPLORER™, MOZILLA FIREFOX™, OPERA™, APPLE SAFARI™, etc. Further, the software executing on clients 202 may be downloaded from server computer 306 to client computers 202 and installed as a plug in or ACTIVEX™ control of a web browser. Accordingly, clients 202 may utilize ACTIVEX™ components/component object model (COM) or distributed COM (DCOM) components to provide a user interface on a display of client 202. The web server 310 is typically a program such as MICROSOFT'S INTERNET INFORMATION SERVER™.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of or connected directly to client 202 instead of communicating/obtaining the information from database 316 across network 302. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S™ Transaction Server (MTS) to access required data stored in database 316 via an interface such as ADO (Active Data Objects), OLE DB (Object Linking and Embedding DataBase), or ODBC (Open DataBase Connectivity).

Generally, these components 308-318 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 202 and 306 may include thin client devices with limited or full processing capabilities, portable devices such as cell phones, notebook computers, pocket computers, and/or any other device with suitable processing, communication, and input/output capability.

Of course, those skilled in the art will recognize that any combination of the above components, or any number of different components, peripherals, and other devices, may be used with computers 202 and 306.

Software Embodiment Overview

Embodiments of the invention are implemented as a software application on a client 202 or server computer 306. Further, as described above, the client 202 or server computer 306 may comprise a thin client device or a portable device that has a multi-touch-based display.

The generation of the geometry has three components:
1) Profile curve matching: Here, a globally optimal match between the sections of the input profile curves P1 and P2 is computed.
2) Profile curve adaptation: From the result of step 1, adapted profile curves P1' and P2' are generated, which are structurally identical but geometrically resemble their respective original.
3) Profile curve morphing: This uses one-to-one vertex position morphing to compute the actual profile curve for a given position on the extrusion line.

Figure 4:
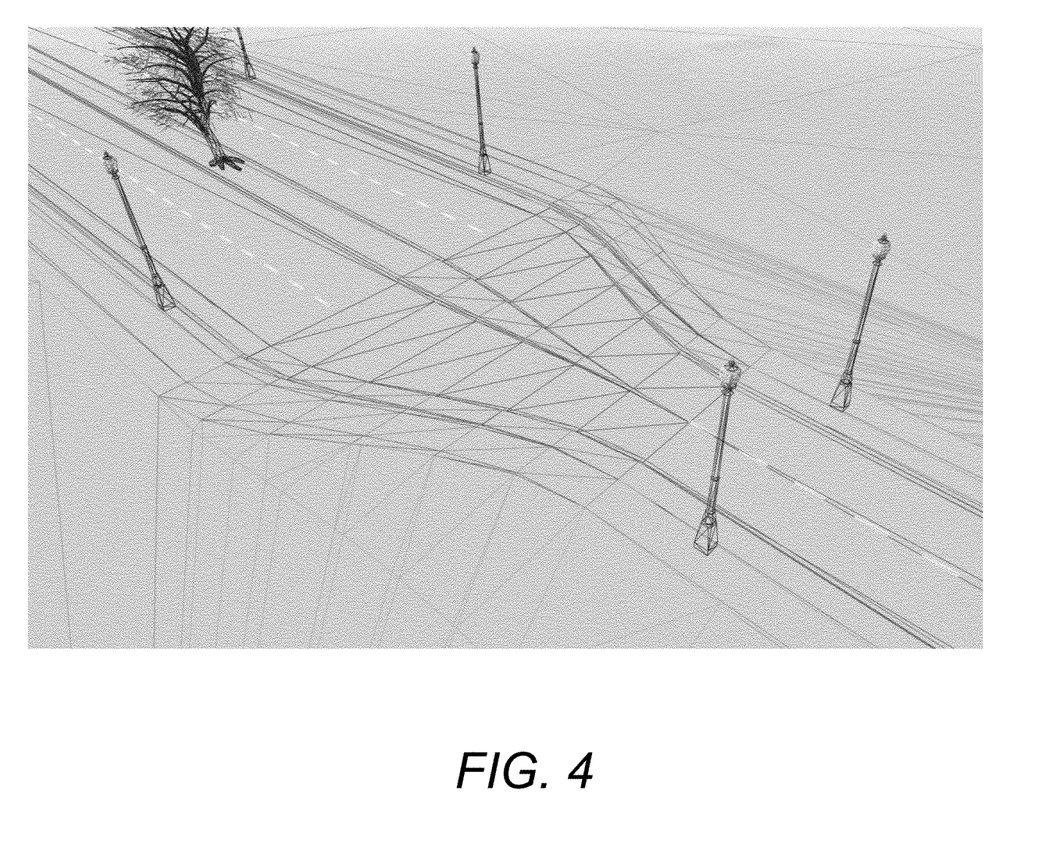
FIG. 4 illustrates a wireframe view of FIG. 1 in accordance with one or more embodiments of the invention.

The result of the morphing can be seen in FIG. 4 which illustrates a wireframe view of FIG. 1. Matching sections (roadway, bikeway, sidewalk) are connected seamlessly while mismatching sections (curbs, greenspaces) emerge from a single point.

The three steps are described in more detail in the following sections.

Profile Curve Matching

Figure 5:
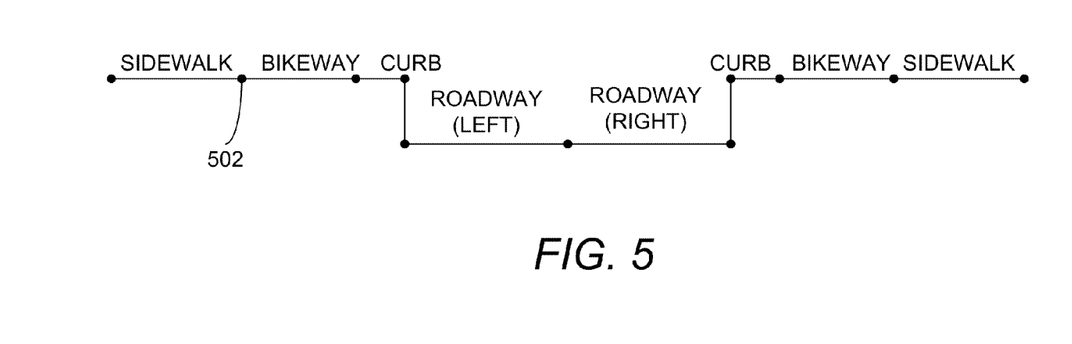
FIG. 5 illustrates an attributed profile curve (style) for the undivided road in FIG. 1 in accordance with one or more embodiments of the invention.

The profile curves consist of sections with constant attributes. Such attributes include graphics attributes, such as normals or texture, and semantic attributes, such as purpose or type. FIG. 5 illustrates an attributed profile curve (style) for the undivided road 102 in FIG. 1. Each circle 502 marks a profile curve vertex. As illustrated, every two vertices form a section. The labels denote the same semantic attribute for each section (there are two sidewalk sections, two bikeway sections, four curb sections [two vertical and two horizontal], a left roadway, and a right roadway).

The main matching step considers semantic information only. For matching semantic information, consecutive sections with constant semantic attributes (but possibly varying other attributes) are treated as a single section sequence. For the road example, semantic attributes can be purpose (roadway, emergency lane, bikeway, sidewalk, curb, greenspace) and/or road side (left, median, right).

Figure 6:
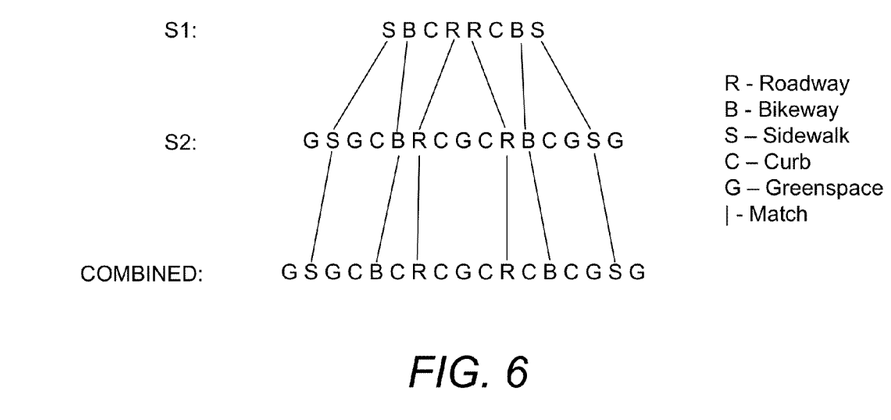
FIG. 6 illustrates the semantic patterns for the situation in FIG. 1 in accordance with one or more embodiments of the invention.

The section sequences build up a semantic pattern for each profile curve. FIG. 6 illustrates the semantic patterns for the situation in FIG. 1. These patterns are used as input to the string edit distance function.

Embodiments of the invention may use a variation of the Needleman & Wunsch function, that uses a weighting function for matches and string manipulations. Embodiments of the invention then search for the manipulation sequence that maximizes the total weight. The length of runs of consecutive identical manipulations (or identical matches) are tracked in order to allow for run-length-dependent weights.

For the road example illustrated in the FIGS. 1, and 4-6, the following weighting scheme may be utilized:
  Matches: A lookup table defines the weight for each purpose value. Road side is not considered. The weights are:

| Roadway | Emergency lane | Bikeway | Side-walk | Curb | Greenspace | Other |
|---------|----------------|---------|-----------|------|------------|-------|
| 10000 | 9000 | 8000 | 7000 | 6000 | 5000 | 1000 |

Insertion into the longer pattern: weight 0
Insertion into the shorter pattern: weight=−run length
Substitutions are not allowed (infinite negative weight)

The edit distance is computed using a standard dynamic programming approach. For patterns S1 of length m and S2 of length n, it creates a table of size (m+1)*(n+1). Cell (0,0) is initialized with weight 0. Thus, continuing with the example of FIGS. 1, and 4-6, Table A may be used:

TABLE A

|   | G | S | G | C | B | R | C | G | C | R | B | C | G | S | G |
|---|---|---|---|---|---|---|---|---|---|---|---|---|---|---|---|
|   | 0 |   |   |   |   |   |   |   |   |   |   |   |   |   |   |
| S |   |   |   |   |   |   |   |   |   |   |   |   |   |   |   |
| B |   |   |   |   |   |   |   |   |   |   |   |   |   |   |   |
| C |   |   |   |   |   |   |   |   |   |   |   |   |   |   |   |
| R |   |   |   |   |   |   |   |   |   |   |   |   |   |   |   |
| R |   |   |   |   |   |   |   |   |   |   |   |   |   |   |   |
| C |   |   |   |   |   |   |   |   |   |   |   |   |   |   |   |
| B |   |   |   |   |   |   |   |   |   |   |   |   |   |   |   |
| S |   |   |   |   |   |   |   |   |   |   |   |   |   |   |   |

Each cell stores a weight, a pointer to the predecessor, and a run length. After filling the table, each cell (i, j) will contain the edit distance between the shortened patterns S1 (length i) and S2 (length j). The pointer in each cell allows for backtracking the exact manipulations necessary for reaching this edit distance. The weight in each cell (i, j) is the maximum of three candidate weights:

1) the weight of cell (i, j−1)+the weight of an insertion into S1 (if j>0)
2) the weight of cell (i−1, j−1)+the weight of the match (if i>0 and j>0 and the patterns S1 and S2 match at position i and j respectively)
3) the weight of cell (i−1, j)+the weight of an insertion into S2 (if i>0)

The predecessor of cell (i, j) is determined by the case that created the maximum. Ties are broken using the listed order.

Figure 10:
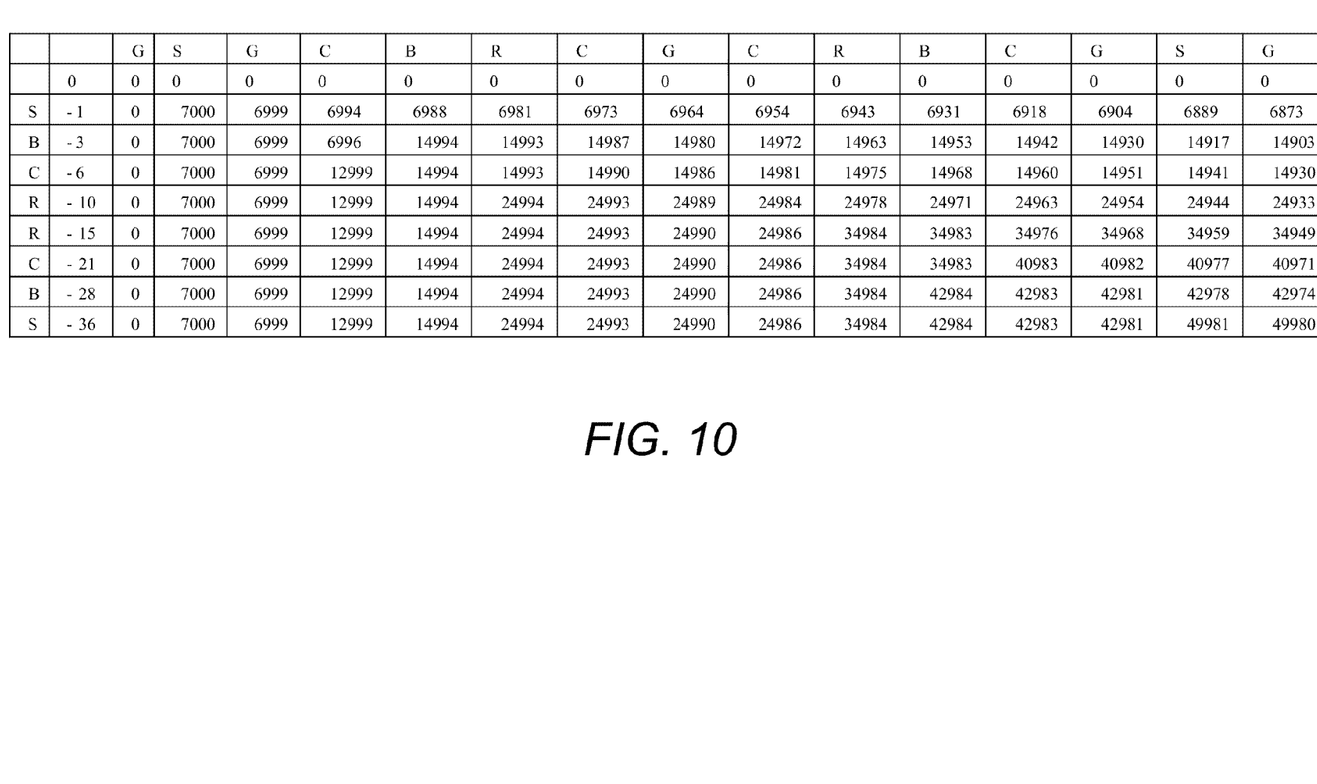
FIG. 10 illustrates the filled in table with the edit distances in accordance with one or more embodiments of the invention.
Figure 11:
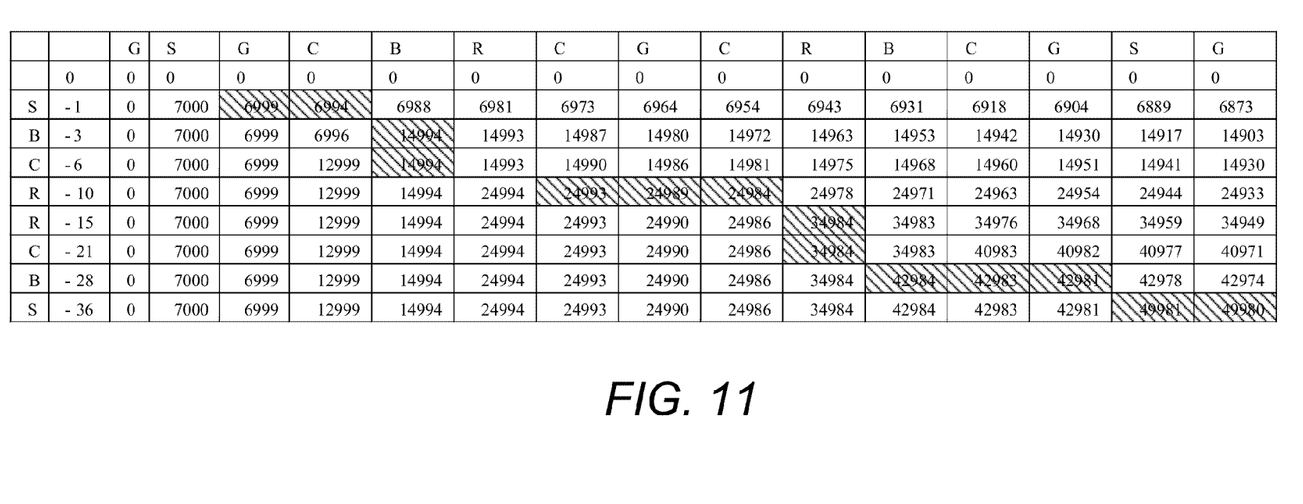

Based on the above, FIG. 10 illustrates the filled in table with the edit distances. After the Table of FIG. 10 has been completed/filled, the sequence of manipulations is determined via backtracking from cell (m, n) to cell (0, 0) using the stored predecessor information and converted into partitions of S1 and S2, such that each match starts a new partition. The table of FIG. 11 illustrates the backtracking for the example in FIG. 6.

Both partitions are stored together in a partition list with each entry containing the matching element of S1 and S2 together with the subsequent non-matching elements. If S1 or S2 start with non-matching elements, the first entry in the partition list contains not-in-list (NIL) markers as matching elements. Table B is an exemplary partition list resulting from matching the patterns in FIG. 6 and the backtracking from the table above:

TABLE B

| Match (S1 and S2): | NIL | S | B | R |   | R | B | S |
|--------------------|-----|---|---|---|---|---|---|---|
| Mismatches (S1):   |     |   | C |   |   | C |   |   |
| Mismatches (S2):   | G   | GC |  | CGC |  |   | CG | G |

Profile Curve Adaptation

From the partition list, new profile curves P1' and P2' are built. Both profile curves are to contain the same sections, but match their originating profile curve's geometry. This is achieved by concatenating all sections from elements from the partition list for one profile curve and inserting the mismatches from the other profile curve appropriately. The build-up has three major components:

1) Aligning Sections within Pattern Matches: Matching pattern elements may consist of multiple profile curve sections. The optimal match among these sections is determined;
2) Adjusting Matching Sections: Once there is a one-to-one match between a section in P1 and P2, both sections need to be adjusted in terms of vertex count in order to allow for one-to-one vertex morphing; and
3) Adding Mismatches: Mismatches do not require vertex count adjustment. However, sections from the other profile curve must be collapsed. Also, the order of insertion is important.

Aligning Sections within Pattern Matches

Pattern elements consist of a sequence of profile curve sections. Two matching pattern elements with a differing number of sections require another matching before building the resulting profile curves. For that purpose, the same string edit distance function described above may be employed but with a different pattern creation and weighting scheme. Now, each section becomes a pattern entry. The weighting ignores semantic attributes (as all sections share the same semantic attribute values), but incorporates other attributes, such as texture, normal, and width for determining a match weight (insertion and mismatch weighting does not change). For the road example, the following match weight table may be used:

| Texture | Normal | Width |
|---------|--------|-------|
| +200 | +100 (in the present example, each section may have a constant normal) | +50/(2 * abs(width1 − width2) + 1) |

The weights are added in case of multiple matching attributes. Using this weighting scheme, a partition list is computed. The partition list controls how profile curve sections are appended to the resulting profile curves. For a partition list entry, first the matching sections, if valid, are adjusted (as described in "Adjusting Matching Sections" below) and appended to P1' and P2' respectively. Then, the mismatching P1 sections are appended to P1' and after collapsing them appended to P2' (as described in "Adding Mismatches" below). Finally, the mismatching P2 sections are appended to P2' and after collapsing them, appended to P1'. These steps are applied for each partition list entry.

The extra alignment step could be merged into the main profile curve matching. However, weights would have to be chosen such that a sequence of multiple low-weight matches cannot outweigh a single high-weight match. In the road example, multiple curb sections must not weight higher than a single roadway match. Otherwise, the curbs would be connected rather than the roadway. Ensuring this property requires sufficient weight differences, which easily exceeds 32 bit integer range and thus becomes impractical. Additionally, separating matching and alignment improves efficiency as the tables used during dynamic programming become significantly smaller.

Adjusting Matching Sections

The goal of this adjustment is to equalize the vertex count of two profile curve sections C1 and C2. For this, new vertices are added to both sections such that the vertex distribution relative to the curve length is similar. The implementation first parameterizes the vertices of the sections relative to the curve length, leading to a function $p_{C_1}(v)$ and $p_{C_2}(v)$. Then, new vertices are added to C1 such that for each vertex $v_{C_2}$ in C2 exists a vertex $v_{C_1}$ in C1 with $p_{C_1}(v_{C_1})=p_{C_2}(v_{C_2})$. Vertex attributes are interpolated linearly between neighboring vertices, if applicable. Similarly, new vertices are added to C2.

Adding Mismatches

Mismatching sections need to collapse to a single point at the opposite profile curve. Thus, a mismatching section C1 from P1 is appended to P1' unchanged, but needs to be collapsed into a single point before appending it to P2'. For the collapsing, the rightmost point of P2' is determined and all vertex locations of C1 to this point are updated. Other attributes remain unchanged. The result forms a new section C1', that is appended to P2'. Mismatching sections from P2 are handled similarly.

Profile Curve Morphing

The adapted profile curves P1' and P2' can be used directly for morphing. Due to the construction, each vertex in P1' has a corresponding vertex in P2'. The swept surface extrusion applies the profile curve to selected positions on the extrusion line. Within the transition zone, an interpolation parameter t is computed from the relative position according to the curve length. This parameter can be additionally transformed by a function f: $[0,1] \rightarrow [0,1]$, such as the smooth-step function, which smoothes the beginning and end of the transition. The value f(t) is used for linear interpolation of all suitable attributes of the corresponding vertices, such as position, normal, and color. It can also be used as a blending factor between differing textures. For attributes that cannot be interpolated, such as semantic attributes, a threshold (e.g., 0.5) can be defined for when to switch between the values.

The interpolated profile curve is used for the extrusion. Usually, this includes orienting the profile curve according to the extrusion line tangent space. Then, the profile curve vertex locations and normals are transformed into world space and finally the new vertices are connected to vertices from the previous extrusion location to form triangles. The resulting mesh can be optimized in terms of triangle count (e.g., by using the Douglas-Peucker function—see en.wikipedia.org/wiki/Ramer-Douglas-Peucker_algorithm which is incorporated by reference herein).

Figure 7:
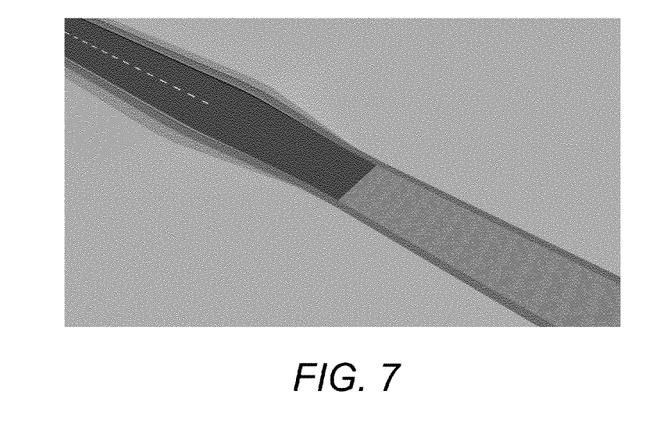
FIGS. 7 and 8 illustrate additional examples for style interpolations in accordance with one or more embodiments of the invention.
Figure 8:
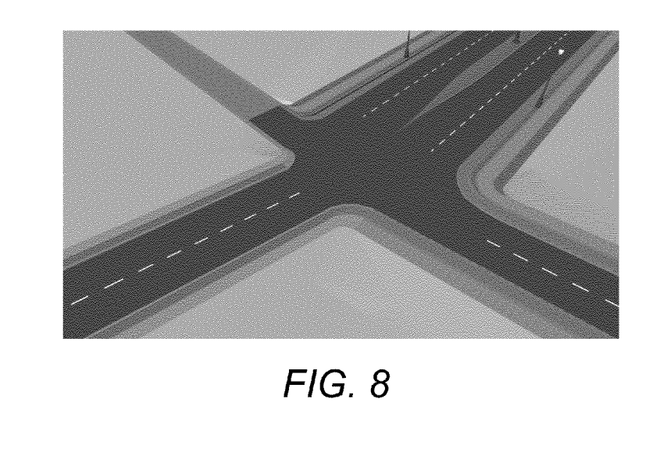

FIGS. 7 and 8 illustrate additional examples for style interpolations in accordance with one or more embodiments of the invention. In FIG. 7, a roadway ends and transitions into a dirt path. FIG. 8 illustrates a roadway with greenspace that transitions into a divided roadway and bikeways after an intersection while another roadway and bikeway end after an intersection.

Logical Flow

Figure 9:
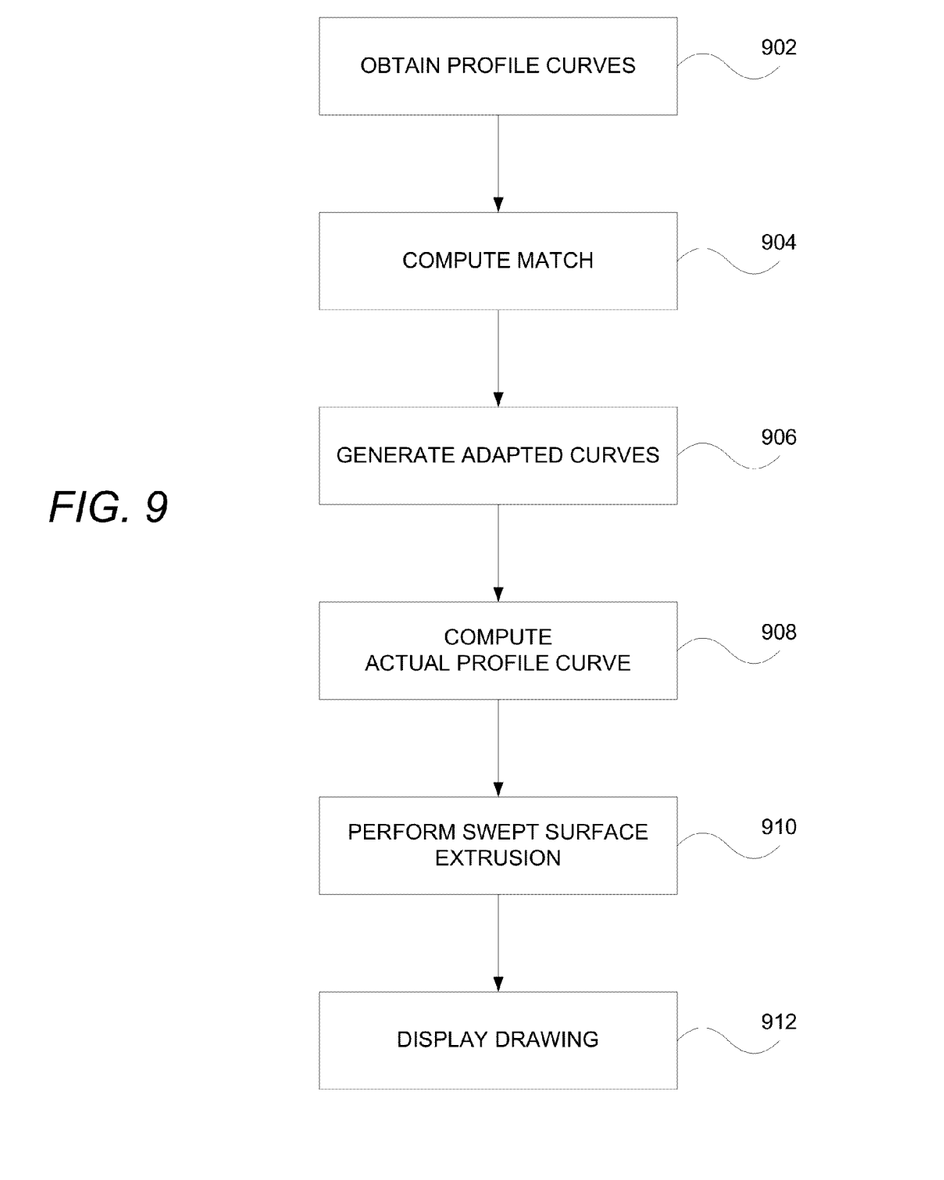
FIG. 9 is a flow chart illustrating the logical flow for transitioning between a first profile curve and a different second profile curve in a swept surface extrusion in accordance with one or more embodiments of the invention.

FIG. 9 is a flow chart illustrating the logical flow for transitioning between a first profile curve and a different second profile curve in a swept surface extrusion in accordance with one or more embodiments of the invention. As described above, the swept surface extrusion may be used to create a road on a road network.

At step 902, the first profile curve and second profile curve are obtained. The two profile curves are different from each other. Further, each profile curve contains one or more section sequences that have one or more consecutive sections. Each consecutive section has two or more constant attributes (that include graphic attributes and semantic attributes). In addition, each section sequence defines a semantic pattern for each profile curve.

At step 904, a globally optimal match between the consecutive sections of the two profile curves is computed (based on the semantic pattern). The globally optimal match may be computed based on a string edit distance function. Such a match is computed by utilizing a weighting function (for matches and string manipulations) and searching for a manipulation sequence that maximizes a total weight. The length of runs of consecutive identical manipulations or identical matches may be tracked to allow for run-length-dependent weights. Further, the weighting function may use a look-up table to define weights for each semantic attribute, a weight of zero for insertion into a longer pattern, a weight of −run length for insertion into a shorter pattern, and substitutions may not be allowed (e.g., infinite negative weight). The output of the match may be a partition list with each entry containing a matching element of the first profile curve and the second profile curve together with subsequent non-matching elements.

At step 906, an adapted first profile curve and an adapted second profile curve are generated. Each adapted curve is structurally identical but geometrically resembles the profile curves on which they are based (i.e., the first and second profile curves). The adapted profile curves may be generated by aligning sections with pattern matches, adjusting a vertex count in each section to allow for one-to-one vertex morphing, adding a first mismatching section from the first profile curve to the adapted first profile curve, and collapsing the first mismatching section in the adapted first profile curve to a single first point of the second adapted profile curve.

At step 908, an actual profile curve for a given position is computed on an extrusion line using a one-to-one vertex position morphing based on the adapted profile curves. The transition between the two adapted profile curves may be generated based on an interpolation parameter t that is computed from a relative position on the extrusion line according to a curve length. The parameter t is transformed by a smoothing function that smoothes a beginning and an end of the transition zone. For the constant attributes that can be interpolated (e.g., position, normal, and color), the smoothing function linearly interpolates the constant attributes in the transition zone. For the constant attributes that cannot be interpolated (e.g., semantic attributes), the smoothing function utilizes a threshold value for when to switch between values of the constant attributes.

At step 910, the swept surface extrusion is performed on the extrusion line based on the actual profile curve.

At step 912, the drawing containing the swept surface extrusion is displayed on a display device. Alternatively, the mesh that is produced from the swept surface extrusion is saved to disk, transmitted to a recipient, further edited, etc.

In summary, line data from a street network may be used to create 3D geometry to display a 3D environment to a user.

Such 3D geometry is created from line data during an extrusion operation when sweeping a profile along the extrusion line to produce the 3D geometry/road. However, with differing profiles/profile curves, there is a need to create a smooth transition and to interpolate data in the transition zone between the two styles. In a first step of embodiments of the invention, only the profiles themselves are considered (i.e., not the geometry but the profile and semantic categories/sections are used). The goal is to come up with a common profile that is shared between the two profile curves. In other words, a full complete pattern that represents both profile curves needs to be generated (e.g., a profile curve with all the semantic attributes but may have a zero-width for one section).

To create the complete profile, the first step involves determining what is similar in both patterns (e.g., computing the match step 904). Various methods may be used to determine a matching curve including string edit distance functions. Different weights may be applied in such a system to ensure that sections cannot be substituted and can only be inserted. Once the match/alignment from the two curves has been determined, new adapted curves are generated that geometrically resemble their respective originals. For example, each adapted profile curve has the missing sections from the other curve but such missing sections are collapsed into a single point (e.g., zero-width). Thereafter, the adapted curves can be used to morph from one adapted curve to the other based on the attributes that change between the curves (e.g., position, normal, color, etc.).

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for transitioning between a first profile curve and a different second profile curve in a swept surface extrusion, comprising:
   (a) obtaining the first profile curve and the second profile curve, wherein:
      (i) the first profile curve is different than the second profile curve;
      (ii) each profile curve comprises one or more section sequences comprised of one or more consecutive sections;
      (iii) each of the one or more consecutive sections comprise two or more constant attributes;
      (iv) the two or more constant attributes comprise one or more graphic attributes and one or more semantic attributes; and
      (v) the one or more section sequences define a semantic pattern for each profile curve;
   (b) computing a globally optimal match between the consecutive sections of the first profile curve and the second profile curve based on the semantic pattern;
   (c) generating an adapted first profile curve and an adapted second profile curve, wherein the adapted first profile curve and the adapted second profile curve have the same sections, and wherein the adapted first profile curve matches a first curve geometry of the first profile curve and the adapted second profile curve matches a second curve geometry of the second profile curve;
   (d) computing an actual profile curve for a given position on an extrusion line using a one-to-one vertex position morphing based on the adapted first profile curve and the adapted second profile curve;
   (e) performing the swept surface extrusion on the extrusion line based on the actual profile curve; and
   (f) displaying, on a display device, a drawing containing the swept surface extrusion.

2. The method of claim 1, wherein the swept surface extrusion is used to create a road on a road network.

3. The method of claim 1, wherein the globally optimal match is computed based on a string edit distance function.

4. The method of claim 3, wherein the globally optimal match is computed by:
   utilizing a weighting function for matches and string manipulations, wherein a length of runs of consecutive identical manipulations or identical matches are tracked to allow for run-length-dependent weights; and
   searching for a manipulation sequence that maximizes a total weight.

5. The method of claim 4, wherein:
   a look-up table defines weights for each semantic attribute;
   a weight of zero (w=0) is used for insertion into a longer pattern;
   a weight of –run length (w=–run length) is used for insertion into a shorter pattern; and
   substitutions are not allowed.

6. The method of claim 1, wherein the globally optimal match outputs a partition list with each entry containing a matching element of the first profile curve and the second profile curve together with subsequent non-matching elements.

7. The method of claim 6, wherein the adapted first profile curve and the adapted second profile curve are generated by:
   aligning the consecutive sections of the first profile curve with consecutive sections of the second profile curve based on pattern matches;
   adjusting a vertex count in each of the consecutive sections to allow for one-to-one vertex morphing;
   adding a first mismatching section from the first profile curve to the adapted first profile curve; and
   collapsing the first mismatching section in the adapted first profile curve to a single first point of the second adapted profile curve.

8. The method of claim 1, wherein within a transition zone between the adapted first profile curve and the adapted second profile curve:
   an interpolation parameter t is computed from a relative position on the extrusion line according to a curve length;
   the parameter t is transformed by a smoothing function that smoothes a beginning and an end of the transition zone;
   for the constant attributes that can be interpolated, the smoothing function is used to linearly interpolate the constant attributes in the transition zone; and for the constant attributes that cannot be interpolated, the smoothing function utilizes a threshold value for when to switch between values of the constant attributes.

9. An apparatus for transitioning between a first profile curve and a different second profile curve in a swept surface extrusion in a computer system comprising:
   (a) a computer having a memory;
   (b) an application executing on the computer, wherein the application is configured to:
      (i) obtain the first profile curve and the second profile curve, wherein:
         (1) the first profile curve is different than the second profile curve;
         (2) each profile curve comprises one or more section sequences comprised of two or more consecutive sections;
         (3) each of the two or more consecutive sections comprise two or more constant attributes;
         (4) the two or more constant attributes comprise one or more graphic attributes and one or more semantic attributes; and
         (5) the one or more section sequences define a semantic pattern for each profile curve;
      (ii) compute a globally optimal match between the consecutive sections of the first profile curve and the second profile curve based on the semantic pattern;
      (iii) generate an adapted first profile curve and an adapted second profile curve, wherein the adapted first profile curve and the adapted second profile curve have the same sections, and wherein the adapted first profile curve matches a first curve geometry of the first profile curve and the adapted second profile curve matches a second curve geometry of the second profile curve;
      (iv) compute an actual profile curve for a given position on an extrusion line using a one-to-one vertex position morphing based on the adapted first profile curve and the adapted second profile curve;
      (v) perform the swept surface extrusion on the extrusion line based on the actual profile curve; and
      (vi) display, on a display device, a drawing containing the swept surface extrusion.

10. The apparatus of claim 9, wherein the swept surface extrusion is used to create a road on a road network.

11. The apparatus of claim 9, wherein the globally optimal match is computed based on a string edit distance function.

12. The apparatus of claim 11, wherein the globally optimal match is computed by:
   utilizing a weighting function for matches and string manipulations, wherein a length of runs of consecutive identical manipulations or identical matches are tracked to allow for run-length-dependent weights; and
   searching for a manipulation sequence that maximizes a total weight.

13. The apparatus of claim 12, wherein:
   a look-up table defines weights for each semantic attribute;
   a weight of zero (w=0) is used for insertion into a longer pattern;
   a weight of −run length (w=−run length) is used for insertion into a shorter pattern; and
   substitutions are not allowed.

14. The apparatus of claim 9, wherein the globally optimal match outputs a partition list with each entry containing a matching element of the first profile curve and the second profile curve together with subsequent non-matching elements.

15. The apparatus of claim 14, wherein the adapted first profile curve and the adapted second profile curve are generated by:
   aligning the consecutive sections of the first profile curve with consecutive sections of the second profile curve based on pattern matches;
   adjusting a vertex count in each of the consecutive sections to allow for one-to-one vertex morphing;
   adding a first mismatching section from the first profile curve to the adapted first profile curve; and
   collapsing the first mismatching section in the adapted first profile curve to a single first point of the second adapted profile curve.

16. The apparatus of claim 9, wherein within a transition zone between the adapted first profile curve and the adapted second profile curve:
   an interpolation parameter t is computed from a relative position on the extrusion line according to a curve length;
   the parameter t is transformed by a smoothing function that smoothes a beginning and an end of the transition zone;
   for the constant attributes that can be interpolated, the smoothing function is used to linearly interpolate the constant attributes in the transition zone; and
   for the constant attributes that cannot be interpolated, the smoothing function utilizes a threshold value for when to switch between values of the constant attributes.

17. A non-transitory computer readable storage medium encoded with computer program instructions which when accessed by a computer cause the computer to load the program instructions to a memory therein creating a special purpose data structure causing the computer to operate as a specially programmed computer, executing a method of transitioning between a first profile curve and a different second profile curve in a swept surface extrusion, comprising:
   (a) obtaining, in the specially programmed computer, the first profile curve and the second profile curve, wherein:
      (i) the first profile curve is different than the second profile curve;
      (ii) each profile curve comprises one or more section sequences comprised of two or more consecutive sections;
      (iii) each of the two or more consecutive sections comprise two or more constant attributes;
      (iv) the two or more constant attributes comprise one or more graphic attributes and one or more semantic attributes; and
      (v) the one or more section sequences define a semantic pattern for each profile curve;
   (b) computing, in the specially programmed computer, a globally optimal match between the consecutive sections of the first profile curve and the second profile curve based on the semantic pattern;
   (c) generating, in the specially programmed computer, an adapted first profile curve and an adapted second profile curve, wherein the adapted first profile curve and the adapted second profile curve have the same sections, and wherein the adapted first profile curve matches a first curve geometry of the first profile curve and the adapted second profile curve matches a second curve geometry of the second profile curve;
   (d) computing, in the specially programmed computer, an actual profile curve for a given position on an extrusion line using a one-to-one vertex position morphing based on the adapted first profile curve and the adapted second profile curve;

(e) performing, in the specially programmed computer, the swept surface extrusion on the extrusion line based on the actual profile curve; and (f) displaying, on a display device, using the specially programmed computer, a drawing containing the swept surface extrusion.

18. The non-transitory computer readable storage medium of claim 17, wherein the swept surface extrusion is used to create a road on a road network.

19. The non-transitory computer readable storage medium of claim 17, wherein the globally optimal match is computed based on a string edit distance function.

20. The non-transitory computer readable storage medium of claim 19, wherein the globally optimal match is computed by:

utilizing a weighting function for matches and string manipulations, wherein a length of runs of consecutive identical manipulations or identical matches are tracked to allow for run-length-dependent weights; and searching for a manipulation sequence that maximizes a total weight.

21. The non-transitory computer readable storage medium of claim 20, wherein:

a look-up table defines weights for each semantic attribute;

a weight of zero (w=0) is used for insertion into a longer pattern;

a weight of −run length (w=−run length) is used for insertion into a shorter pattern; and substitutions are not allowed.

22. The non-transitory computer readable storage medium of claim 17, wherein the globally optimal match outputs a partition list with each entry containing a matching element of the first profile curve and the second profile curve together with subsequent non-matching elements.

23. The non-transitory computer readable storage medium of claim 22, wherein the adapted first profile curve and the adapted second profile curve are generated by:

aligning the consecutive sections of the first profile curve with consecutive sections of the second profile curve based on pattern matches;

adjusting a vertex count in each of the consecutive sections to allow for one-to-one vertex morphing;

adding a first mismatching section from the first profile curve to the adapted first profile curve; and collapsing the first mismatching section in the adapted first profile curve to a single first point of the second adapted profile curve.

24. The non-transitory computer readable storage medium of claim 17, wherein within a transition zone between the adapted first profile curve and the adapted second profile curve:

an interpolation parameter t is computed from a relative position on the extrusion line according to a curve length;

the parameter t is transformed by a smoothing function that smoothes a beginning and an end of the transition zone;

for the constant attributes that can be interpolated, the smoothing function is used to linearly interpolate the constant attributes in the transition zone; and for the constant attributes that cannot be interpolated, the smoothing function utilizes a threshold value for when to switch between values of the constant attributes.

* * * * *